(12) United States Patent
Agrawal et al.

(10) Patent No.: US 10,129,791 B2
(45) Date of Patent: *Nov. 13, 2018

(54) BYTE CACHING IN WIRELESS COMMUNICATION NETWORKS

(71) Applicant: International Business Machines Corporation, Armonk, NY (US)

(72) Inventors: Dakshi Agrawal, Monsey, NY (US); Bongjun Ko, Harrington Park, NJ (US); Franck Le, White Plains, NY (US); Robert B. Nicholson, Winchester (GB); Vasileios Pappas, New York, NY (US); Dinesh Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/133,358

(22) Filed: Apr. 20, 2016

(65) Prior Publication Data

US 2016/0234719 A1    Aug. 11, 2016

Related U.S. Application Data

(63) Continuation of application No. 13/601,306, filed on Aug. 31, 2012, now Pat. No. 9,351,196.

(51) Int. Cl.
*H04L 12/28* (2006.01)
*H04W 28/14* (2009.01)
(Continued)

(52) U.S. Cl.
CPC ............. *H04W 28/14* (2013.01); *H04L 47/30* (2013.01); *H04W 4/18* (2013.01); *H04W 28/06* (2013.01);
(Continued)

(58) Field of Classification Search
CPC ....... H03M 7/30; H03M 7/3059; H04L 69/04; H04L 65/607; H04L 12/1895
See application file for complete search history.

(56) References Cited

U.S. PATENT DOCUMENTS 8,391,148 B1    3/2013  Wang
8,502,707 B2 *  8/2013  Fallon ...................... G06T 9/00
                                                   341/50
(Continued)

OTHER PUBLICATIONS

Le, Franck; Byte Caching in Wireless Networks; Jun. 21, 2012; http://researcher.ibm.com/researcher/files/us-aruni/ByteCachingicdcs2012.pdf.*

(Continued)

*Primary Examiner* — Hee Soo Kim
*Assistant Examiner* — Ho T Shiu
(74) *Attorney, Agent, or Firm* — Fleit Gibbons Gutman Bongini Bianco PL; Thomas S. Grzesik (57) ABSTRACT

Various embodiments provide byte caching in wireless communication networks. In one embodiment, a plurality of data packets are received through an internet protocol (IP) data flow established between a wireless communication device and at least one server. Each of the plurality of data packets are combined into a packet bundle. A determination is made as to whether a second byte caching system is available. The packet bundle is transformed using one or more byte caching operations based on a second byte caching system being available. The transformed packet bundle is sent to the second byte caching system using an IP communication mechanism.

12 Claims, 6 Drawing Sheets

(51) Int. Cl.

| | | |
|---|---|---|
| *H04W 28/12* | (2009.01) | |
| *H04W 4/18* | (2009.01) | |
| *H04W 28/06* | (2009.01) | |
| *H04L 12/835* | (2013.01) | |
| H03M 7/30 | (2006.01) | |
| H04L 29/06 | (2006.01) | |
| H04L 12/18 | (2006.01) | |

(52) U.S. Cl.
CPC ......... *H04W 28/065* (2013.01); *H04W 28/12* (2013.01); *H03M 7/30* (2013.01); *H03M 7/3059* (2013.01); *H04L 12/1895* (2013.01); *H04L 65/607* (2013.01); *H04L 69/04* (2013.01)

(56) References Cited

U.S. PATENT DOCUMENTS

| | | | |
|---|---|---|---|
| 8,692,695 | B2 | 4/2014 | Fallon et al. |
| 8,862,761 | B1 | 10/2014 | Nguyen et al. ............... 709/231 |
| 2002/0057716 | A1 | 5/2002 | Svanbro et al. |
| 2003/0030575 | A1 | 2/2003 | Frachtenberg et al. |
| 2003/0204678 | A1 | 10/2003 | Lee |
| 2006/0007934 | A1 | 1/2006 | Chemiakina |
| 2006/0104303 | A1* | 5/2006 | Makineni ................ H04L 69/16 370/463 |
| 2007/0064737 | A1 | 3/2007 | Williams ..................... 370/473 |
| 2007/0245090 | A1 | 10/2007 | King et al. |
| 2008/0153460 | A1 | 6/2008 | Chan et al. |
| 2008/0307219 | A1 | 12/2008 | Karandikar |
| 2009/0040926 | A1 | 2/2009 | Li et al. |
| 2009/0254731 | A1 | 10/2009 | Maheshwari et al. |
| 2009/0327412 | A1 | 12/2009 | Lepeska |
| 2010/0017600 | A1 | 1/2010 | Lepeska et al. |
| 2010/0070570 | A1 | 3/2010 | Lepeska |
| 2010/0103953 | A1 | 4/2010 | Matlas et al. |
| 2010/0179986 | A1 | 7/2010 | Sebastian et al. |
| 2011/0113195 | A1 | 5/2011 | Riddle |
| 2011/0125820 | A1 | 5/2011 | Lin |
| 2011/0202634 | A1 | 8/2011 | Kovvali et al. |
| 2011/0267207 | A1 | 11/2011 | McCanne et al. |
| 2012/0226820 | A1 | 9/2012 | Li et al. |
| 2013/0018932 | A1 | 1/2013 | Bhaskar et al. |
| 2013/0128947 | A1 | 5/2013 | Fryer et al. .............. 375/240.01 |
| 2014/0013057 | A1 | 1/2014 | Agrawal et al. |
| 2015/0003515 | A1* | 1/2015 | Normile ............... H04N 19/156 375/240.02 |

OTHER PUBLICATIONS

Anand, A., et al., "Redundancy in Network Traffic: Findings and Implications," SIGMETRICS/Performance'09, Jun. 15-19, 2009, Seattle, WA, USA, Copyright 2009 ACM 978-1-60558-511-6/09/06.

Spring, N., et al., "A Protocol-Independent Technique for Eliminating Redundant Network Traffic," SIGCOMM'00, Stockholm, Sweden, Copyright 2000 ACM 1-58113-224-7/00/0008.

Great Britain patent application No. 1204363.4 filed on Mar. 13, 2012 entitled "Optimisation of Mobile Data Communication Using Byte Caching," inventors: Rob Nicholson, Vic Moore, and Dakshi Agrawal.

Le, et al., "Byte Caching in Wireless Networks," 2012 IEEE 32nd International Conference on Distributed Computing Systems (ICDCS), Jun. 21, 2012.

International Search Report and Written Opinion dated Apr. 7, 2014 for International Patent Application No. PCT/US2013/057479.

Non-Final Office Action dated Jul. 2, 2014 for U.S. Appl. No. 13/601,306.

Le, Franck, Byte Caching in Wireless Networks; Jun. 21, 2012; http://researcher.ibm.com/researcher/files/us-anuni/ByetCachingicdcs2012.pdf.

Non-Final & Office Action dated Feb. 2, 2015 received for U.S. Appl. No. 13/601,306.

* cited by examiner

BYTE CACHING IN WIRELESS COMMUNICATION NETWORKS

BACKGROUND

The present invention generally relates to network data transmission, and more particularly relates to byte caching in wireless communication networks.

A key problem with communication via mobile networks is the rapid increase of data traffic. The density of mobile computing platforms is increasing at an exponential rate. Mobile computing platforms include traditional platforms such as phones, tablets and mobile broadband enabled laptops but increasingly also mobile data enabled devices, such as GPS systems, cars, even mobile medical equipment. This exponential increase brings significant new challenges for Mobile Network Operators (MNOs) as data becomes the majority of the content they deliver. Specifically although additional base stations are fairly easy to deploy to increase the available aggregate "air interface" bandwidth, the connections back from the base stations to the radio network controller (RNC), typically implemented as microwave links, are bandwidth constrained. Upgrading these connections to fiber optic connections is very expensive. Similarly increasing the available bandwidth in the RNC and core network is expensive as well.

BRIEF SUMMARY

In one embodiment, a method for performing byte caching in wireless communication networks is disclosed. The method comprises receiving a plurality of data packets through an internet protocol (IP) data flow established between a wireless communication device and at least one server. Each of the plurality of data packets are combined into a packet bundle. A determination is made as to whether a second byte caching system is available. The packet bundle is transformed using one or more byte caching operations based on a second byte caching system being available. The transformed packet bundle is sent to the second byte caching system using an IP communication mechanism.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
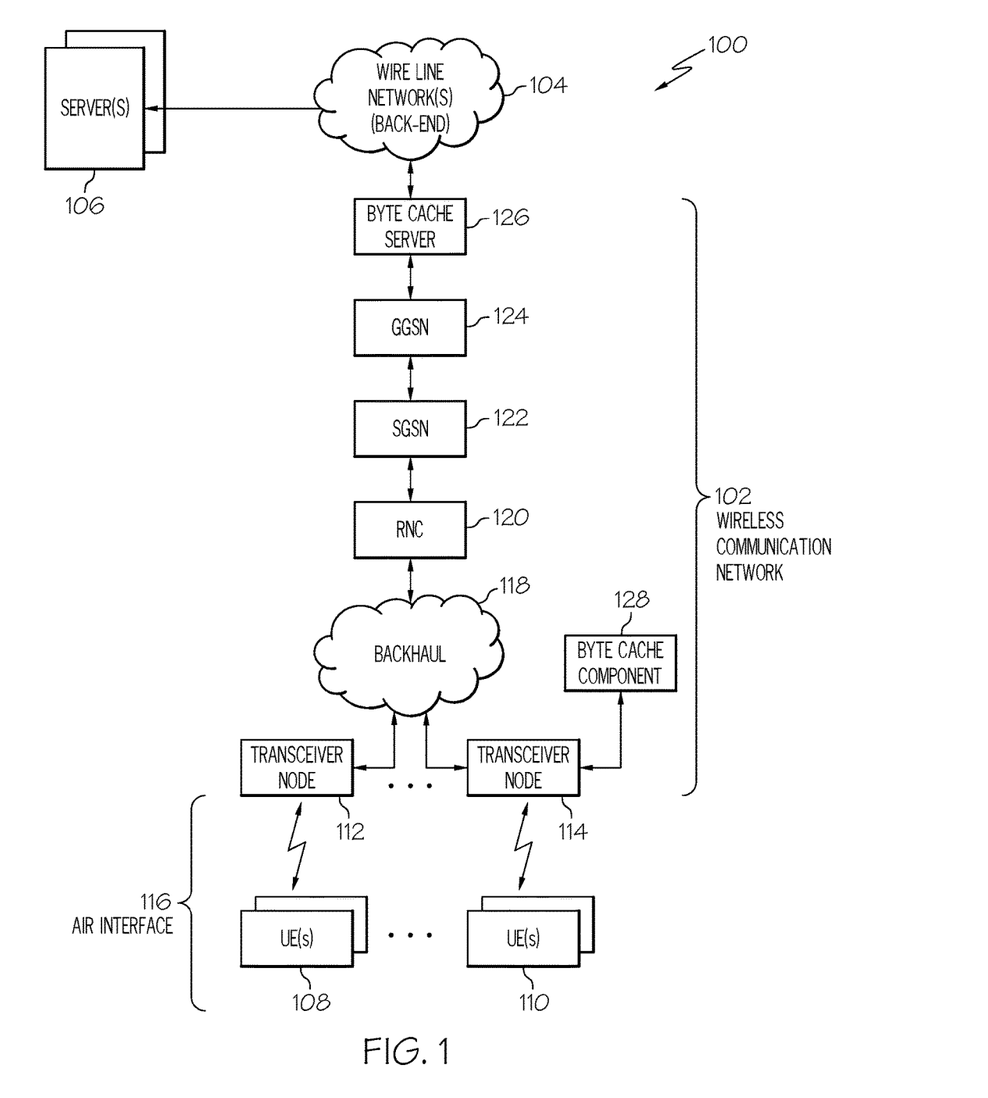
FIG. 1 is a block diagram illustrating one example of an operating environment according to one embodiment of the present invention.

FIG. 1 shows an operating environment 100 according to one embodiment of the present invention. The operating environment 100 comprises one or more wireless communication networks 102 that are communicatively coupled to one or more wire line networks 104. For purposes of simplicity, only the portions of these networks that are relevant to embodiments of the present invention are described. The wire line network 104 acts as a back-end for the wireless communication network 102. In this embodiment, the wire line network 104 comprises one or more access/core networks of the wireless communication network 102 and one or more Internet Protocol (IP) networks such as the Internet. The wire line network 104 communicatively couples one or more content sources/providers, such as a server(s) 106, to the wireless communication network 102. In further embodiments, the back-end is not a wire line network. For example, in one embodiment the back-end is a wireless network and takes the form of a point-to-point back-end network such as a directional microwave network used to transmit and receive signals bi-directionally. Alternatively, the back-end takes the form of a network of peers in which a mobile base station (e.g., eNode B in the case of GSM and its descendants) is itself used as a back-end network for other base stations.

The wireless communication network 102 supports any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication network 102 includes one or more networks based on such standards. For example, in one embodiment, the wireless communication network 102 comprises one or more of a Long Term Evolution (LTE) network, an Evolution Data Only (EV-DO) network, a GPRS network, a Universal Mobile Telecommunications System (UMTS) network, and the like.

FIG. 1 further shows that one or more user devices (also referred to herein as "user equipment (UE)") 108, 110 are communicatively coupled to the wireless communication network 102. The UE devices 108, 110, in this embodiment, are wireless communication devices such as two-way radios, cellular telephones, mobile phones, smartphones, two-way pagers, wireless messaging devices, laptop computers, tablet computers, desktop computers, personal digital assistants, and other similar devices. UE devices 108, 110 access the wireless communication network 102 through one or more transceiver nodes 112, 114 using one or more air interfaces 116 established between the UE devices 108, 110 and the transceiver node 112, 114.

In another embodiment, one or more UE devices 108, 110 access the wireless communication network 102 via a wired network and/or a non-cellular wireless network such as, but not limited to, a Wireless Fidelity (WiFi) network. For example, the UE devices 108, 110 can be communicatively coupled to one or more gateway devices via wired and/or wireless mechanisms that communicatively couples the UE devices 108, 110 to the wireless communication network 102. This gateway device(s), in this embodiment, communicates with the wireless communication network 102 via wired and/or wireless communication mechanisms.

The UE devices 108, 110 interact with the wireless communication network 102 to send/receive voice and data communications to/from the wireless communication network 104. For example, the UE devices 108, 110 are able to wirelessly request and receive content (e.g., audio, video, text, web pages, etc.) from a provider, such as the server 106, through the wireless communication network 102. The requested content/service is delivered to the wireless communication network 102 through the wire line network 104.

A transceiver node 112, 114 is known as a base transceiver station (BTS), a Node B, and/or an Evolved Node B (eNode B) depending on the technology being implemented within the wireless communication network 104. Throughout this discussion a transceiver node 112, 114 is referred to as a "base station". The base station 112, 114 is communicatively coupled to one or more antennas and a radio network controller (RNC) 118 (or base station controller (BSC)), which manages and controls one or more base station 112, 114. It should be noted that in a 4G LTE network, the eNodeB communicates directly with the core of the cellular network.

The RNC 118 can be included within or separate from a base station B 112, 114. The base stations 112, 114 communicate with the RNC 118 over a backhaul link 120. In the current example, a base station 112, 114 is communicatively coupled to a Serving GPRS (SGSN) 122, which supports several RNCs 118. The SGSN 122 is communicatively coupled to Gateway GPRS Support Node (GGSN) 124, which communicates with the operator's service network (not shown). The operator's service network connects to the Internet at a peering point. It should be noted that even though UMTS components are illustrated in FIG. 1 embodiments of the present invention are applicable to other wireless communication technologies as well.

In one example, the communication protocols between the UE devices 108, 110 and the GGSN 124 are various 3rd Generation Partnership Project (3GPP) protocols over which the internet protocol (IP) traffic from the UE devices 108, 110 is tunneled. For example, a GPRS tunneling protocol (GTP) is utilized between the RNC 118 and the GGSN 124. A standard Internet Protocol (IP) is utilized between the GGSN 124 and the wire line network 104. The server(s) 106 has a TCP (Transmission Control Protocol) socket that communicates with a TCP socket at the UE devices 108, 110 when a user wishes to access data from the server 106. An IP tunnel is created from the GGSN 251 to UE devices 108, 110 for user traffic and passes through the interim components, such as the RNC 118 and the SGSN 122.

As noted above, increased data traffic in wireless communication networks can cause congested links and degraded network performance. Therefore, one or more embodiments of the present invention implement two or more byte caching devices/systems 126, 128 between the base stations 112, 114 and the server(s) 106. Each of these byte caching devices 126, 128 performs byte caching operations to reduce network traffic on the network. The byte caching devices 126, 128 intercept traffic that is guaranteed to go through both of the devices 126, 128. Each byte caching device 126, 128 looks at the data passing through it and stores the byte sequences (and their corresponding hashes or signatures) that are likely to repeat again in the data. If a stored byte sequence passes through a byte caching device again 126, 128 the device replaces the byte sequence with its signature/fingerprint. When this signature/fingerprint passes through the other byte caching device the signature/fingerprint replaced by the original byte sequence. Since only a (short) signature/fingerprint is transmitted instead of a long byte sequence, byte caching reduces bandwidth consumption.

In one embodiment, a hub and spoke arrangement is utilized for the byte caching devices 126, 128, where one or more hub byte caching components 126 are located deeper in the wireless communication infrastructure and each are paired with one or more spoke byte caching components 128 within or coupled to the base stations 112, 114 or RNC 118 (as opposed to one-to-one relationship of byte caching nodes). For example, FIG. 1 shows a hub or byte caching server 126 disposed between the wire line network 104 and the GGSN 124 (e.g., the point where the network connects to the peering point with the Internet). The byte caching server 126 operates as a conventional transparent transfer protocol proxy but has additional byte caching behavior as discussed below. FIG. 1 further shows at least one spoke or byte caching device 128 is disposed (or coupled to) one or more base stations 112, 114. This byte caching device/component 128 includes breakout and byte cache functionality to optimize data transfer. This byte caching component 128 manipulates the transfer protocol connection between the UE devices 108, 110 and the core as discussed below.

Figure 2:
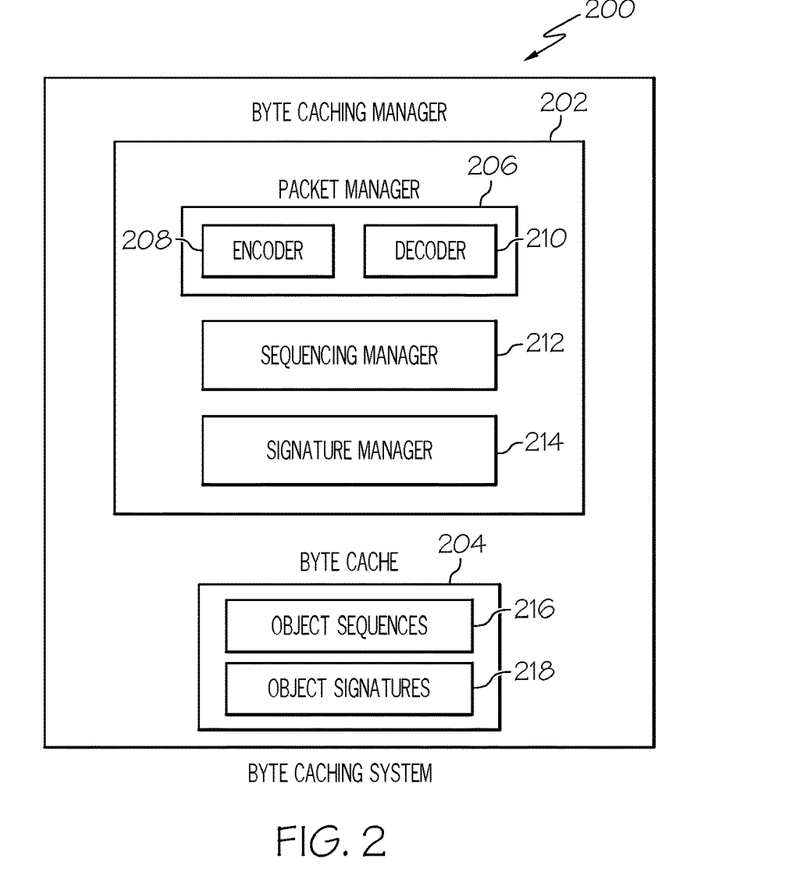
FIG. 2 is a block diagram illustrating a detailed view of a byte caching system according to one embodiment of the present invention.

FIG. 2 shows a more detailed view of a byte caching system 200 such as the byte caching server 126 or the BCNB 128. In particular, FIG. 2 shows that, in one embodiment, the byte caching system 200 comprises a byte caching manager 202 and a byte cache 204. The byte caching manager 202 manages byte caching operations at the byte caching system 200. The byte cache 204 is a memory cache or any other type of storage component that stores byte sequences of data objects within data packets and their signatures/hashes.

The byte caching manager 202 comprises a packet manager 206, a sequencing manager 212, and a signature manager 214. The packet manager 206 comprises an encoder 208 and a decoder 210. The encoder 208 encodes data packets for transmission to a destination node. The decoder 210 decodes packets received by the byte caching system 200 for processing thereof. It should be noted that packet manager 206 can also include any other hardware and/or software for receiving, sending, and managing data packets. The byte caching manager 202, in one embodiment, comprises a sequencing manager 212 and a signature manager 214. The sequencing manager 212 divides/partitions the data object into a plurality of byte sequences 216 (also referred to as "chunks" or "object sequences"). The signature manager 214 calculates a signature or fingerprint 218 for each of object sequences 216 created by the sequencing manager 212. The signature/fingerprint 218 can be a hash value or any other data that can uniquely identify the object chunk. The byte cache 204 stores the object sequences 216 and/or the signatures 218 of the sequences 216.

Byte Caching for Wireless Communication Networks

As discussed above, one or more embodiments implement the byte caching devices 126, 128 using a hub and spoke arrangement for performing byte caching operations within the wireless communication network 102. As will be discussed in greater detail below, the byte caching devices 126, 128 are configured to compress a communication flow between a UE device 108, 110 and the server(s) 106 (and vice versa) by looking across multiple IP packets and compressing these packets to create new IP packets. The byte caching systems 126, 128 transport these IP packets across the wireless communication network using existing Layer 2 (data link layer) mechanisms by exploiting existing IP routing or a tunneling mechanism (depending on infrastructure support). When one byte caching device receives an IP packet(s) from the other byte caching device, the receiving byte caching device recreates the original IP packet(s) and injects these packets back in the network towards the UE device(s) 108, 110. Layer 2 mechanisms can be utilized to deliver IP packets to the UE device 108, 110. This configuration enables byte-caching in the presence of end user mobility exploiting IP layer forwarding/routing mechanisms of the underlying wireless communication network. Also, bandwidth savings and higher throughput are provided as compared to TCP-layer based byte caching. It should be noted that embodiments of the present invention are also applicable outside the space of Cellular Network Providers (CNPs) as well.

The UE device 108 establishes an IP tunnel with the wireless communications network 102 in a conventional manner. For example, the UE device 108 makes a TCP connection to a port (e.g., port 80) at a server 106 it wishes to receive data from. This TCP connection is transparently proxied by the byte caching server 126. Once the UE device 108 establishes an IP tunnel the byte caching manager 202 at the byte caching server 126 determines whether or not the base station 112 coupled to the UE device 108 is associated with a byte caching device 126. For example, a mapping of flows from the hub byte caching device 128 to spoke byte caching devices 128 can be maintained through various mechanisms. One example of a mapping mechanism is given in the commonly owned U.S. patent application Ser. No. 13/601,251 entitled "Mobility Detection For Edge Applications In Wireless Communication Networks", filed on Aug. 31, 2012, the entire disclosure of which is hereby incorporated by reference in its entirety.

In addition, the byte caching server 126 can maintain a list of base stations 112 that are associated with a byte caching device 128. When the UE device 108 establishes the IP tunnel the base station 112 can identify itself to the byte caching server 126. The byte caching manager 202 at the byte caching server 126 compares an identifier received from base station to the list and determines if the base station 112 coupled to the UE device 108 is associated with a byte caching device. In another example, a byte caching device 128 signals to the byte caching sever 126 that it is present in the data path. In one embodiment, this signaling is provided by modifying the TCP header of the TCP packet to insert a marker TCP option into the options field in the TCP header. The byte caching server 126 intercepts these added TCP options, interprets, and removes them. Alternative embodiments of this feature include sending marker IP datagrams or modifying the IP header of the TCP packets. If the byte caching server 126 does not receive a signal from a byte caching component 128 within a given amount of time the byte caching manager 202 at the byte caching server 126 determines that the base station 112 is not associated with a byte caching device 128 or that the byte device component is unavailable.

If the byte caching manager 202 determines that the base station 112 is not associated with a byte caching device 128 or that the byte caching device 128 is unavailable the byte caching server 126 does not alter any data packets received from the server 106 destined for reception by the UE device 108, 110. However, the byte caching server 126 still examines the data packets, calculates signatures/fingerprints, and stores away chunks of the data object(s) within the data packet(s) in the byte cache 204, which can be on their signature/fingerprint.

Figure 3:
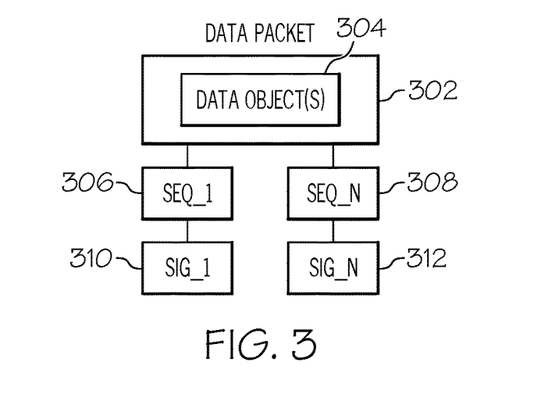
FIG. 3 shows one example of a performing byte caching on a data packet according to one embodiment of the present invention.

For example, the packet manager 206 sends the received packets to the sequencing manager 212 of the byte caching manager 202. The sequencing manager 212 divides/partitions the data payload 304 (e.g., data object(s)) of the data packet 302 into a plurality of byte sequences (e.g., sections/chunks) 306, 308, as shown in FIG. 3. Once the sequencing manager 212 has divided/separated the data packet 302 into a plurality of byte sequences 306, 308 the signature manager 214 calculates a signature/fingerprint 310, 312 for each of the byte sequences 306, 308. A signature/fingerprint 306, 308 can be a hash value or any other data that can uniquely identify a sequence/chunk. The byte caching manager 202 then compares the byte sequences 306, 308 to byte sequences 216 stored within the byte cache 204 to determine if the data object(s) 304 within the data packet 302 has been previously received. If a match exists this indicates that the same data object has been previously received and the matching byte sequences 306, 308 and their signatures 310, 312 are not stored. A match also indicates that the matching byte sequences are stored within the byte cache of a spoke byte caching device since it is part of the same byte caching environment as the hub byte caching device. If the byte cache 204 at does not comprise the byte sequences 306, 308 (or signatures 310, 312) this indicates that this data object 304 has not been previously received by the byte caching sever 126 and the byte sequences 306, 308 and/or their signatures 310, 312 are stored in the byte cache 204.

It should be noted that the byte caching manager 202 can also utilize the signatures 310, 312 to determine if the data object 304 has been previously received by the byte caching sever 126. For example, in one embodiment, the signatures of byte sequences are also stored within the byte cache 204 along with the byte sequences. If the byte caching manager 202 determines that signatures exist within the byte cache 204 that match the generated signatures then this indicates that the data object has been previously received and is stored within the byte cache of a spoke byte caching device as well. Once the byte caching manger stores the byte sequences in the byte cache or determines that the byte sequences have been previously stored in the byte cache the byte caching server sends the data packet onward to the UE device 108, 110. It should be noted that the above process for caching byte sequences of a data packet is only one example of a byte caching mechanism applicable to various embodiments of the present invention.

If the byte caching manager determines that the base station 112 is associated with a byte caching device 128 that is available for byte caching operations, the byte caching server 126 performs packet bundling, data transformation, and data transportation operations. With respect to packet bundling, the packet manager 206 at the byte caching sever 126 stores the data packets belonging to the same end-to-end network flow in a local buffer (not shown) for a given period of time, which can depend on the round-trip time of the end-to-end flow. The storage of received bytes in a temporary buffer allows the byte caching sever 126 to process the bytes and to eliminate redundancy across the boundaries of data packets. In other words, sequences can expand across multiple packets. The packet manager 206 orders the buffered data packets based on the way those packets were generated by the end nodes (e.g., server 106). For example, in a TCP flow, packets may be ordered by using the sequence number information attached on every TCP header. It should be noted that the ordering by TCP sequence number is not necessary since this is an IP Layer implementation. However, the ordering can still be performed to the extent possible given the constraints of buffering so that better bandwidth savings can be achieved (out of sequence bundling reduces chances of a future match of a long sequence of bytes).

Figure 4:
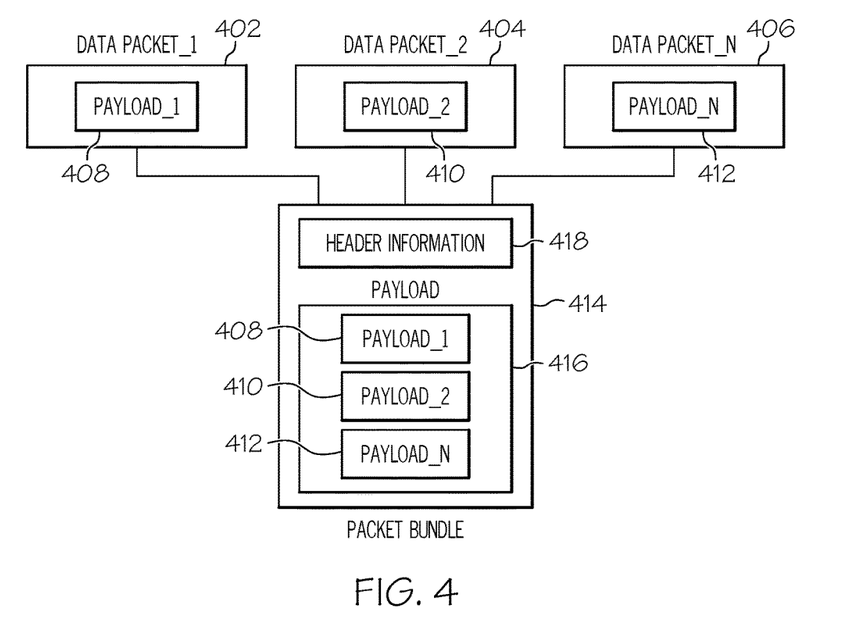
FIG. 4 shows one example transforming a plurality of data packets into a packet bundle according to one embodiment of the present invention.

Once a given number of packets have been buffered or a given buffering time period has been reached the packet manager 206 concatenates and combines the payload (data objects) of the buffered data packets into a larger data unit referred to as a "packet bundle", as shown in FIG. 4. For example, FIG. 4 shows a plurality of buffered data packets 402, 404, 406 associated with the same end-to-end network flow. Each of these data packets 402, 404, 406 comprises a payload (one or more data objects) 408, 410, 412. FIG. 4 also shows a packet bundle 414 comprising a concatenated/combined payload 416 created from the payloads) 408, 410, 412 of the buffered data packets 402, 404, 406.

Each packet bundle 414 comprises some additional header information 418 that enables the correct reconstruction of the original application data. The header information comprises the transport header information of all the packets combined in the packet bundle. This header information can be compressed using standard compression techniques, such as Lempel-Ziv-Welch compression, or other compression techniques taking advantage of transport layer protocol knowledge. For example in the case of TCP flows, the header contains the TCP sequence number of the first byte of the concatenated data in the packet bundle. Other information within the bundle header can include acknowledged sequence number(s), set TCP flags, etc. Valid end-to-end flow packets can be reconstructed using the header information 418. Note that the reconstructed packets may not necessarily be the same as the original packets. However, the application layer data should be the same as the original date and they should be delivered in the order generated by the application.

Once a packet bundle 414 is created the combined payload 416 within the bundle 414 is compressed by the byte caching manager 202. Various compression techniques can be used. In one embodiment, the selection of the compression technique depends on the capabilities of the receiving byte-caching device 128 that the end-to-end flow goes through. As discussed above, if a receiving byte caching device does not exist in the end-to-end flow or is not available the bundling and compression operations are not performed.

Figure 5:
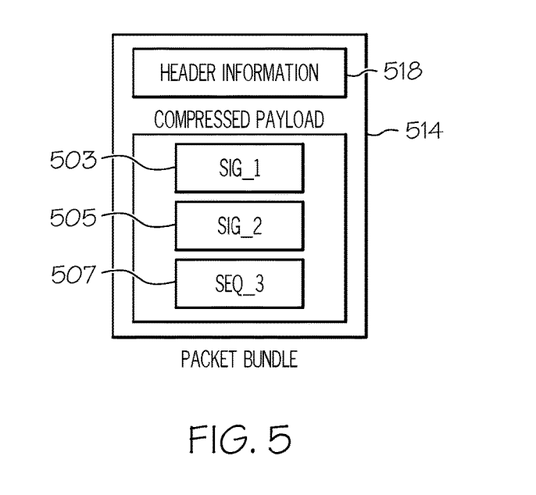
FIG. 5 shows one example of compressing a packet bundle using byte caching according to one embodiment of the present invention.

If there is a receiving byte-caching device 128 along the path of the end-to-end flow the combined payload data 416 in the bundle 414 is compressed based on the cache content of that device 128, as shown in FIG. 5. For example, similar to the process discussed above, the sequencing manager 212 divides/separates the payload 416 of the packet bundle 414 into a plurality of byte sequences. The signature manager 214 then calculates a signature/fingerprint for each of the byte sequences. As discussed above, a signature/fingerprint can be a hash value or any other data that can uniquely identify the object chunk.

The byte caching manager 202 then compares the byte sequences and/or the signatures to the sequences and/or signatures within the byte cache 204, as discussed above. If a match exists this indicates that the same payload (or portion of the payload) has been previously received and transmitted to the receiving byte caching device 128. A match also indicates that the byte sequences are stored within the byte cache of the receiving byte caching device 128 since it is part of the same byte caching environment as the byte caching server 126. If the byte cache 204 at the byte caching server 126 does not comprise the byte sequences (or signatures) this indicates that this payload (or portion of the payload) has not been previously received by the byte caching server 126. It should be noted that the byte caching manager 202 can also utilize the signatures to determine if the payload (or portion of the payload) has been previously received, as discussed above.

If the byte caching manager 202 does not identify any sequences/signatures corresponding to the payload (or portion of the payload) the byte caching manager 202 determines that this payload (or portion of the payload) has not been previously received and transmitted to the receiving byte caching device 128. Therefore, the byte caching manager 202 stores the byte sequences of the payload (or portion of the payload) and its signature(s) within the byte cache 204. In an alternative embodiment only the signature(s) is stored within the byte cache 204. The package manager 202 then transmits packet bundle 414 to the receiving byte caching device 128.

However, if the byte caching manager 202 identifies a match for at least one of the sequences (or signatures) the byte caching manager 202 determines that the payload (or portion thereof) in the packet bundle 414 was previously received and sent to the receiving byte caching device 128. For example, consider three byte sequences, Seq_1, Seq_2, and Seq_3. The byte caching manager 202 determines that a match for byte sequences Seq_1 and Seq_2 exists within the byte cache 204. The byte caching manager 202 also determines that a match does not exist within the byte cache 204 for Seq_3. Therefore, the byte caching manager 202 determines a portion of the combined payload 414 has been a previously received payload and another portion of the combined payload 414 is new. The new portion, e.g., Seq_3, and its signature, e.g., Sig_3 are stored within the byte cache 204. A compressed packet bundle 514 is generated, as shown in FIG. 5, by encoding the packet bundle 514 with the signatures Sig_1 503 and Sig_2 505 for sequence Seq_1 and Seq_2 along with the byte sequence Seq_3 507. The encoded packet bundle 514 is a compressed packet bundle 414 since it only includes the signatures Sig _1 503 and Sig_2 505 for sequence Seq_1 and Seq_2 as compared to comprising the actual sequences Seq_1 and Seq_2.

The compressed payload data 516 and the packet bundle header information 518 are then transported to that receiving byte-cache device 128. It should be noted that each compressed packet bundle 514 is a self-contained data unit. Stated different, the original data (i.e., uncompressed data) as well as the original packets combined in the bundle can be recovered by using only information present in the bundle 514 and a local byte cache. The compressed packet bundle 514 does not explicitly refer to data in other bundles, although the compressed packet bundle can implicitly refer to data in other bundles if that data has not been stored in a local byte cache.

Figure 6:
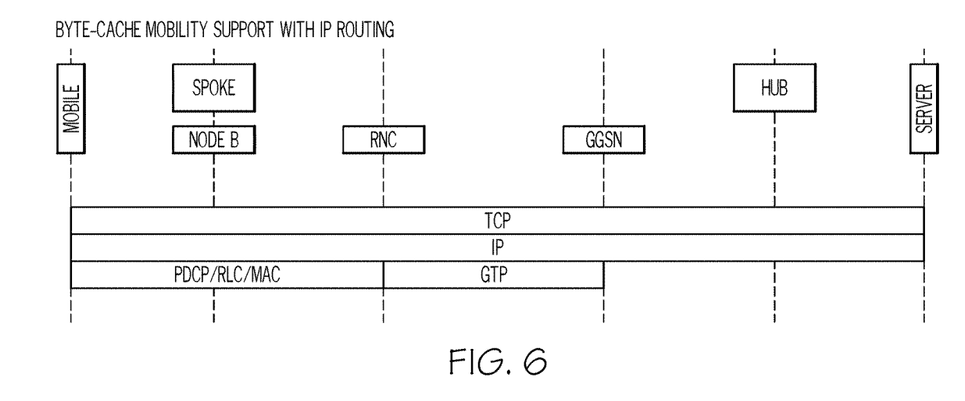
FIG. 6 shows the protocol encapsulations for IP routing according to one embodiment of the present invention.
Figure 7:
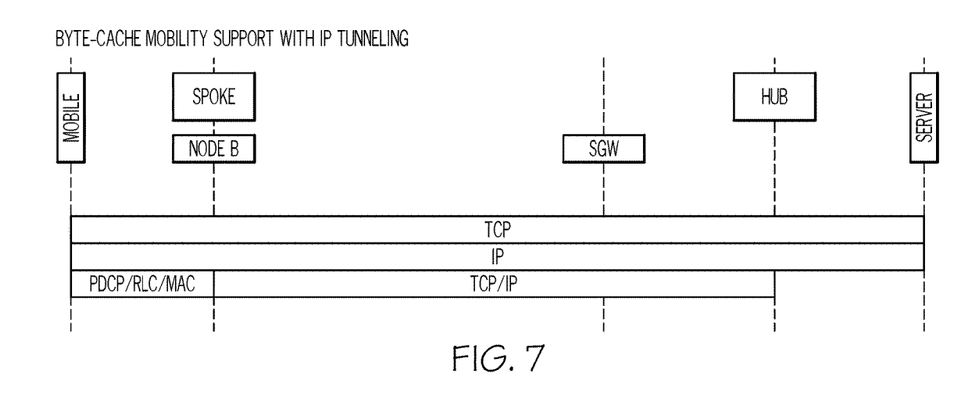
FIG. 7 shows the protocol encapsulations for IP Tunneling according to one embodiment of the present invention.

Compressed packet bundles 514 are transported from the byte caching server 126 (e.g., the encoder) to the receiving byte caching device 128 (e.g., the decoder), using either IP Routing or IP Tunneling. FIG. 6 shows the protocol encapsulations for IP routing and FIG. 7 shows the protocol encapsulations for IP Tunneling. If IP Routing is utilized each compressed packet bundle 514 is encapsulated within one IP packet using the source and destination IP addresses of the end-to-end network flow related to the bundle. An IP packet is packet that has an IP head and payload, with a total size that is no more than the size of the maximum transfer unit (MTU) of the path between the hub and spoke byte-caches. The MTU of the end-to-end flow (between server and client) can be smaller than the MTU between the byte-caches. When IP Routing is utilized the bundle packet 514 is forwarded as it was going to be delivered to the destination of the end-to end flow. Once the packet goes through the receiving byte caching device 128 the packet 514 is intercepted. The compressed data is reconstructed by a byte caching manager at the receiving byte caching device 128 as discussed below. In this example, each compressed packet bundle 514 can fit within a single IP packet. However, if a compressed packet bundle 514 cannot within a single IP packet the bundle is divided in two or more self-contained bundles, with each of them being capable of fitting within an IP packet. A self-contained bundle is one that contains enough information to recreate the original data and packets contained in the bundle.

If IP Tunneling is utilized each compressed packet bundle 514 is encapsulated in one or more IP packets that are transported directly to the receiving byte caching device 128. In this embodiment, compressed packet bundles 514 are explicitly sent from one byte-cache device to another, without relying on routing the data towards the destination node of the end-to-end flow. This approach assumes a closer integration with the location/routing database of the CNP or availability of a network capable of connecting the two byte caching devices independently. Also, this embodiment does not require splitting an IP bundle packet that is bigger than the maximum transfer unit, to smaller self-contained bundle packets, as realizable transport protocols, such as TCP, can be used for transferring the IP bundle packet to the receiving byte-cache device.

Once the receiving byte caching device 128 receives a compressed packet bundle 514 it first decompresses the payload data using information from the local cache and then it constructs a number of end-to-end flow packets using the header information of the packet bundle and the decompressed payload data. For example, the receiving byte caching device 128 receives the compressed packet bundle 514 and performs a process similar to that discussed above with respect to the byte caching server 126. The byte caching manager of the receiving byte caching device 128 extracts the signatures Sig _1 503 and Sig _2 505 from the packet 514. The byte caching manager utilizes these signatures to find the corresponding byte sequences Seq_1 and Seq_2 within its byte cache. The byte caching manager also generates the byte sequence and signature for byte sequence Seq_3 507 that is within the packet 514. This byte sequence and signature are then stored within the byte cache. The byte caching manager then reconstructs the packet using the retrieved byte sequences along with the byte sequence that was within the packet and sends the reconstructed packet to the UE device(s) 108, 110.

By using the above unique packet combination/transformation/transportation process one or more embodiments are able to compress payload data that spans across multiple IP packets without the need to split the end-to-end network flow into two or more intermediate flows. Also, bandwidth savings and higher throughput are provided as compared to TCP-layer based byte caching.

Mobility

Another advantage is that byte-caching is enabled in the presence of end user mobility exploiting IP layer forwarding/routing mechanisms of the underlying wireless communication network. For example, critical transient considerations are introduced as a mobile travels from one base station to another. Therefore, one or more embodiments ensure that the packet bundling and data transportation operations discussed above are correctly performed under the transient conditions induced by mobility so that the mobile application layer receives correct data as intended by the sender.

A first situation occurs when the UE device 108 moves from a base station 112 without byte caching to a base station 112 that does support byte caching. In this situation, the byte caching sever 126 detects a base station capable of byte caching and performs the byte caching operations discussed above. A second situation occurs when the UE device 108 moves between base stations capable of performing byte caching. In this situation there are three error conditions that are addressed. In the first error condition, the byte caching sever 126 transforms/compresses a packet bundle, as discussed above, assuming that the UE device 108 is connected to the first base station. However, due to mobility and the L2 forwarding mechanism of the underlying wireless communication network, these packets end up at the second base station. The second base station, which is capable of byte caching, intercepts these packets determines if it is capable of reconstructing transformed packets, as discussed above. If so, the second base station informs the byte caching sever 126 that packets transformed for the first base station were received by the second base station, reconstructed, and forwarded to the UE device 108. The second base station also informs the byte caching server 126 that subsequent packets are to be transformed assuming that UE device 108 is attached to the second base station. If the second base station is incapable of reconstructing the packets then the second base station informs the byte caching server 126 that packets transformed for the first base station have been received and also requests the remaining information needed to reconstruct the packets. The byte caching server 126 then sends the remaining information and also determines that subsequent packets are to be transformed assuming that the UE DEVICE 108 is coupled to the second base station.

In a second error condition, some IP packets are lost during the transitioning of the UE DEVICE 108 from the first base station to second base station. These IP packets do not reach the second base station (within some time window/trigger). This can occur either because packets were routed to first base station or for some other temporary reason. In this situation, lost packets are recovered by end-to-end transport protocols (e.g., TCP), or not recovered at all if the transport/application protocols do not require recovery. In a third error condition, the byte caching server 126 receives inconsistent, incomplete or unstable information regarding which base station the UE device 108 is coupled to (e.g. multiple base stations claim that the UE device 108 is connected to them). In this situation, the byte caching server 126 stops byte caching and sends packets without any transformation until the status of the UE device 108 is clear.

In a third situation, a UE device 108 moves from a first base station 112 that supports byte caching to a second base station 114 that does not support byte-caching. In this situation three types of errors can occur. In a first error condition, the byte caching server 126 transforms packets (as discussed above) under the assumption that the UE device 108 is connected to the first base station 112. However, because of mobility and the L2 forwarding mechanism of the underlying wireless communication network, these packets are received by the second base station 114. The second base station 114 is not byte caching capable and therefore, these packets are forwarded as-is and are received by the UE device 108. However, due to the unique port numbers and/or manipulations in the packet header used, the UE device 108 is not be able to associate these packets to any existing flow and discards them. In a worst case scenario, this is treated as packet loss by the sender who then resends these packets. In an alternative embodiment, this is detected by the byte caching server 126 using TCP acknowledgements and/or TCP flags (if the flow is a TCP flow) from the UE device 108. The byte caching server 126 stops applying byte-caching to that flow.

In a second error condition, some IP packets are lost while the UE device 108 transitions from the first base station 112 to the second base station 114. These packets do not reach the second base station 114 (within sometime window/trigger). In this situation, lost packets are recovered by end-to-end transport protocols (e.g. TCP), or not recovered at all if the transport/application protocols do not require recovery. In a third error condition, the byte caching server 126 receives inconsistent, incomplete or unstable information regarding which base station the UE device 108 is coupled to (e.g. multiple base stations claim that the UE device 108 is connected to them). In this situation, the byte caching server 126 stops byte caching and sends packets without any transformation until the status of the UE device 108 is clear. It should be noted that while mobility considerations have been discussed above under the assumption that the sender is located in the Internet and receiver is a UE device, similar techniques can be applied to take into account transient conditions due to mobility when the UE device is the sender and receiver is somewhere in the Internet.

Operational Flow Diagrams

Figure 8:
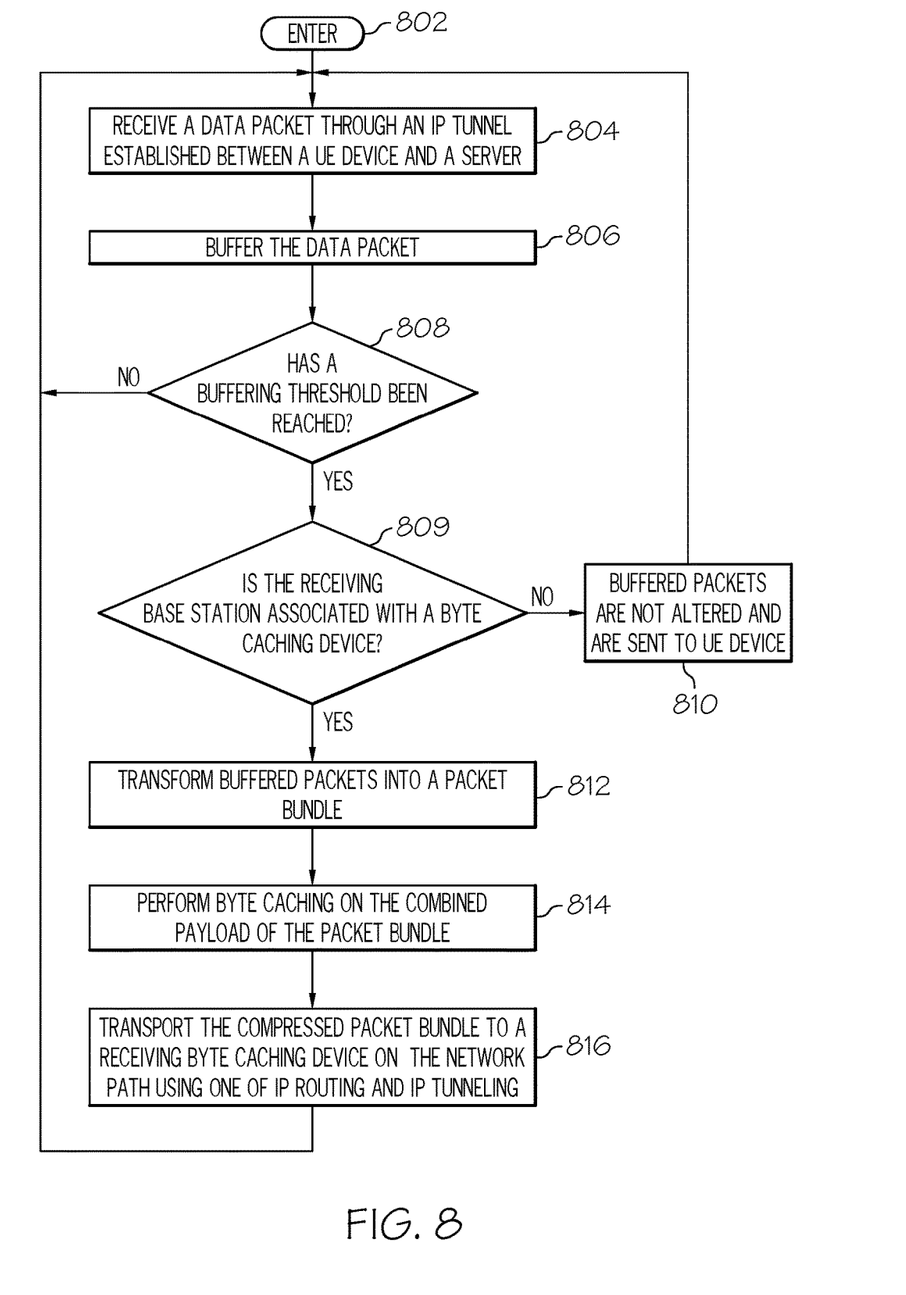
FIG. 8 is an operational flow diagram illustrating one example of byte caching in a wireless communication network according to one embodiment of the present invention.

FIG. 8 is an operational flow diagram illustrating one example of performing byte caching in wireless communications network. The operational flow diagram of FIG. 8 begins at step 802 and flows directly to step 804. A first byte caching device 128, at step 804, receives at least one data packet of an end-to-end data flow through an IP tunnel. A byte caching manager 202 at the first byte caching device 128, at step 806, buffers the data packet. The byte caching manager 202, at step 808, determines if a buffering threshold (e.g., time interval, number of buffered packets, etc.) has been reached. If the result of this determination is negative, the control flow returns to step 804. If the result of this determination is positive, the byte caching manager 202, at step 809, determines if a second byte caching device 128 exists on the other end of the data flow. If the result of this determination is negative, the buffered packets, at step 810, are sent to the destined UE device 108 without any alteration. As discussed above, the byte caching manager 202 caches any byte sequences corresponding to the data packets and/or the signatures of the byte sequences for any payloads (data objects) that have not been previously received. The control flow returns to step 804.

If the result of the determination at step 809 is positive, the byte caching manager 202, at step 812, transforms the buffered packets into a packet bundle 414, as discussed above. The byte caching manager 202, at step 814, performs byte caching operations on the combined payload of the packet bundles 414. For example, the byte caching manager 202 divides/partitions the combined payload into a plurality of byte sequences/chunks. The byte caching manager 202 also generates signatures/fingerprints for each of these sequences and determines if any of the sequences have been previously received. If so, the byte caching manager 202 compresses the bundle packet by replacing the byte sequences with their signatures/fingerprints inside the packet bundle 414. Alternatively, a new packet bundle can be created. Any byte sequence that has not been previously received is stored in the byte cache 204 and also maintained within the compressed packet bundle. The byte caching manager 202, at step 816, transports the compressed packet bundle to the second byte caching device 128 using one of IP Routing and IP tunneling. The control flow returns to step 804.

Information Processing System

Figure 9:
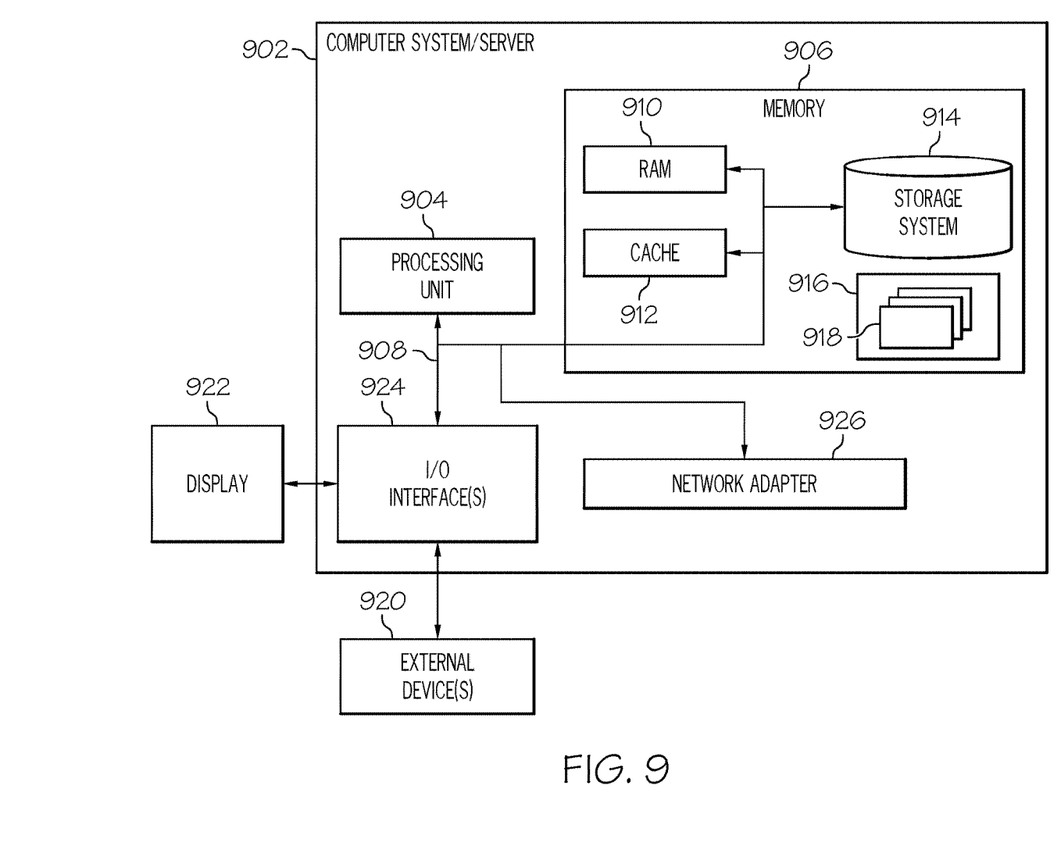
FIG. 9 is a block diagram illustrating one example of an information processing system according to one embodiment of the present invention.

Referring now to FIG. 9, this figure is a block diagram illustrating an information processing system that can be utilized in embodiments of the present invention. The information processing system 902 is based upon a suitably configured processing system configured to implement one or more embodiments of the present invention (e.g., byte caching systems/devices 126, 128 of FIG. 1). Any suitably configured processing system can be used as the information processing system 902 in embodiments of the present invention. The components of the information processing system 902 can include, but are not limited to, one or more processors or processing units 904, a system memory 906, and a bus 908 that couples various system components including the system memory 906 to the processor 904.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 9, the main memory 906 includes the byte caching manager 202 and byte cache 204. Each of these components can reside within the processor 904, or be a separate hardware component. The system memory 906 can also include computer system readable media in the form of volatile memory, such as random access memory (RAM) 910 and/or cache memory 912. The information processing system 902 can further include other removable/non-removable, volatile/non-volatile computer system storage media. By way of example only, a storage system 914 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 908 by one or more data media interfaces. The memory 906 can include at least one program product having a set of program modules that are configured to carry out the functions of an embodiment of the present invention.

Program/utility 916, having a set of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of embodiments of the present invention.

The information processing system 902 can also communicate with one or more external devices 920 such as a keyboard, a pointing device, a display 922, etc.; one or more devices that enable a user to interact with the information processing system 902; and/or any devices (e.g., network card, modem, etc.) that enable computer system/server 902 to communicate with one or more other computing devices. Such communication can occur via I/O interfaces 924. Still yet, the information processing system 902 can communicate with one or more networks such as a local area network (LAN), a general wide area network (WAN), and/or a public network (e.g., the Internet) via network adapter 926. As depicted, the network adapter 926 communicates with the other components of information processing system 902 via the bus 908. Other hardware and/or software components can also be used in conjunction with the information processing system 902. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, with a first byte caching system, for performing byte caching in a wireless communication network device comprising:
    receiving a plurality of data packets through an internet protocol (IP) data flow established between a wireless communication device and at least one server;
    combining each of the plurality of data packets into a single packet bundle, wherein the combining comprises combining a payload from each of the plurality of data packets into a combined payload and storing the combined payload in the packet bundle;
    dividing the combined payload into a plurality of byte sequences;
    determining that a second byte caching system has previously received only a subset of the plurality of byte sequences;
    based on the second byte caching system having previously received only a subset of the plurality of byte sequences, transforming the packet bundle to include a set of signatures each representing one of the subset of the plurality of byte sequences and to further include a remaining set of the plurality of byte sequences; and
    sending the transformed packet bundle to the second byte caching system via an IP communication mechanism.

2. The method of claim 1, further comprising:
    buffering the plurality of data packets until a buffering threshold has been reached.

3. The method of claim 1, further comprising:
    adding a set of header information associated with the combined payload to the packet bundle.

4. The method of claim 1, further comprising:
    storing, based on the second byte caching system having previously received at least a first of the plurality of byte sequences, a signature representing the at least a first of the plurality of byte sequences in the packet bundle.

5. The method of claim 4, further comprising:
    determining that the second byte caching system has failed to receive at least a second of the plurality of byte sequences; and
    storing, based on the determining, the at least a second of the plurality of byte sequences in the packet bundle.

6. The method of claim 1, further comprising:
    determining that the second byte caching system is available by receiving a signal from the second byte caching server indicating an availability of the second byte caching system.

7. The method of claim 1, wherein the sending comprises:
    encapsulating the transformed packet bundle within at least one IP packet using at least a source address and a destination address associated with the IP data flow.

8. The method of claim 1, wherein the sending comprises:
    encapsulating the transformed packet bundle within at least one IP packet; and
    sending the IP packet directly to the second byte caching system.

9. The method of claim 1, wherein the packet bundle is a self-contained data unit, wherein a payload of each of the plurality of packets is reconstructable from data within the packet bundle and a byte cache.

10. The method of claim 1, further comprising:
    receiving an indication from a third byte caching system that the wireless communication device has moved from a base station associated with the second byte caching system to a base station associated with the third byte caching system; and
    sending, based on the receiving, subsequent packet bundles to the third byte caching system.

11. The method of claim 1, further comprising:
    receiving a first indication from at least a one byte caching system that the wireless communication device is currently coupled to a base station;
    receiving a second indication from at least one additional byte caching system that the wireless communication device is currently coupled to a second base station; and
    halting, based on receiving the first and second indications, byte caching operations on subsequently received data packets.

12. The method of claim 1, further comprising:
    determining the wireless communication device has been decoupled from a first base station associated with the second byte caching system and is currently coupled to a second base station failing to be associated with a byte caching system; and
    halting, in response to the determining, byte caching operations on subsequently received data packets.

* * * * *